United States Patent [19]
Culter

[11] 4,231,060
[45] Oct. 28, 1980

[54] COLOR-PULLING COMPENSATION IN A BEAM-INDEX DISPLAY TUBE

[75] Inventor: Robert G. Culter, Seattle, Wash.

[73] Assignee: Tektronix, Inc., Beaverton, Oreg.

[21] Appl. No.: 30,262

[22] Filed: Apr. 16, 1979

[51] Int. Cl.² ............................................. H04N 9/24
[52] U.S. Cl. ...................................... 358/69; 315/10; 315/12 ND
[58] Field of Search .............. 358/67, 69, 70; 315/10, 315/11, 12 ND

[56] References Cited
U.S. PATENT DOCUMENTS

| | | | |
|---|---|---|---|
| 2,900,562 | 8/1959 | Burns, Jr. ........................... | 315/10 |
| 3,406,251 | 10/1968 | Jones ................................... | 358/67 |
| 3,536,823 | 10/1970 | Goode et al. ....................... | 358/67 |

*Primary Examiner*—John C. Martin
*Attorney, Agent, or Firm*—Thomas J. Spence

[57] ABSTRACT

A system and method for varying the phase of an index-related control signal produced within a beam-index display system in a manner compensating for the effects of cross-modulating the index signal with the video drive signals. Provision is made for monitoring the magnitudes of selected video drive signals and for shifting the phase of the control signal in a manner compensating for the effects of such drive signals on the index signal from which the control signal is derived.

6 Claims, 3 Drawing Figures

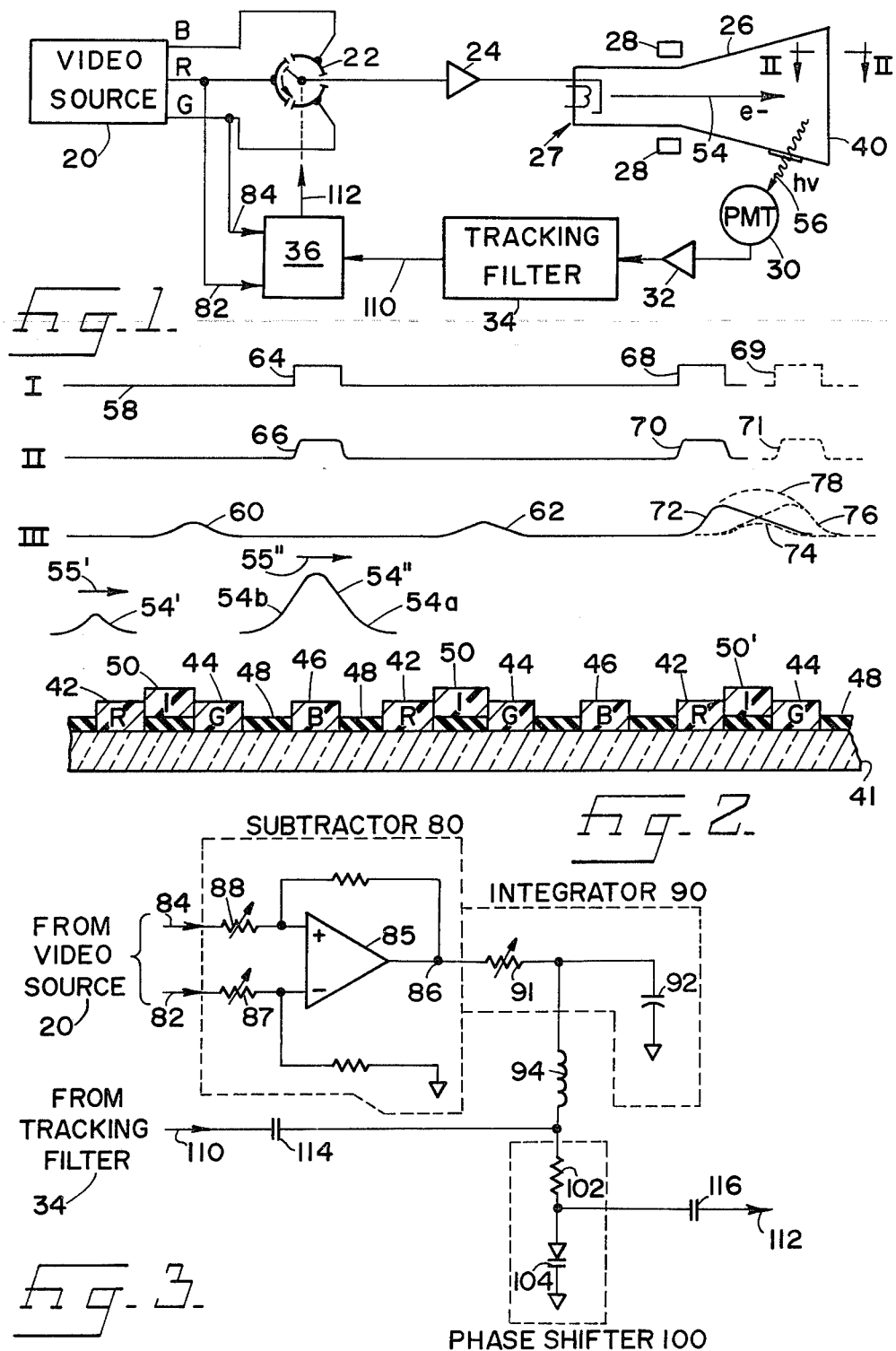

COLOR-PULLING COMPENSATION IN A BEAM-INDEX DISPLAY TUBE

BACKGROUND OF THE INVENTION

The subject matter of the present invention pertains to means for correcting color-pulling or video-pulling in a color display system using a beam-index color cathode-ray tube. A detailed description of beam-index tubes and the color-pulling phenomenon may be found in A. M. Morrell et at., "Color Television Picture Tubes", Academic Press, New York, 1974, all pertinent parts of which are incorporated herein by this reference.

As is known to the art, a beam-index cathode-ray tube includes a specialized display medium comprising a first spaced array of vertically oriented color phosphor bands disposed in a horizontal direction across the interior surface of a supportive faceplate, and a second spaced array of vertically oriented index phosphor bands similarly disposed so as to have a predetermined periodic relationship with the color bands. An electron beam produced within the tube and caused to sweep across the display medium while its current density is suitably modulated selectively excites both the color bands and the index bands to produce not only a desired color image but also a frequency-modulated index signal, the phase of which is a function of the location of the beam relative to the index bands at any given time. The index signal thus produced is employed, in a closed-loop manner, to control the selection of the image-defining color drive signals used to modulate the current density of the electron beam producing both the signal and the image. Such an arrangement ensures ideally that the information being supplied to the electron beam at any given time corresponds precisely to the information desired to be presented at the location defined by the phosphor band currently being addressed by the beam.

A common problem encountered in the operation of beam-index tubes is that of cross-modulation of the index signal by the color drive signals used to modulate the beam current. Absent modulation, the current density of the electron beam is maintained at a level just sufficient to excite the index bands and produce the index signal. The resultant index signal is substantially uniform in frequency and represents accurately the actual locations of the index bands, and thereby the actual locations of the similarly arrayed color bands. However, when the current density of the beam is modulated with the color drive signals to produce a desired image, the sensed index signal tends to lead or lag its true time position and thereby produce an inaccurate indication of the beam position relative to the phosphor arrays. The amount of such lead or lag is dependent primarily on the spaced relationship between the index bands and the color bands, the magnitude of the beam density modulation, the particular color band currently being addressed, and the beam spot size and shape. Such a phenomenon is known as color-pulling or video-pulling. If not corrected, it has a distorting effect on the color quality of the image being produced.

Known attempts to minimize or eliminate the effects of such cross-modulation of the index signal by the color drive signals include the use of separate electron beams to produce the index signal and the color image (the so-called Apple Tube), the use of a non-integral relationship between the pitch of the index bands and the color bands, and distortion averaging (so-called Turner Tube). These attempts, however, have either added undue complexity to the overall system or been ineffective in providing correction for a general class of video drive signals.

SUMMARY OF THE INVENTION

The present ivention is directed to means within a beam-index color display system for minimizing the effects of cross-modulating the index signal with the video signal employed to produce the desired image, such cross-modulation being the result of inadvertent excitation of the index bands of the display medium during the time that the electron beam is being modulated to excite the color bands. More particularly, the invention comprises circuitry, including a subtractor section, an integrator section, and a phase-shifter section, by which the phase of a frequency-modulated signal employed to control the gating of video drive signals from a video source to the beam-producing apparatus of a beam-index cathode-ray tube is dynamically shifted by an amount sufficient to compensate for any phase variance introduced by such cross-modulation. In practice, the video drive signals represent color characteristics of the image to be produced; however, other differential characteristics may be represented as well without departing from the invention as disclosed. The circuitry resides operationally between a tracking filter producing a frequency-modulated control signal in phased relationship with the sensed index signal and a commutator circuit employed, under control of the frequency-modulated signal, to sequentially select the video drive signals for transfer to the beam-index tube.

In operation, selected video drive signals are constantly monitored by the subtractor section of the compensation circuitry to detect those combinations of such signals most likely to produce the undesired cross-modulation of the index signal by the video signal. An output signal produced by the subtractor section is integrted by the integrator section and used to vary the capacitance of a varactor diode forming a part of the phase-shifter section, and thereby vary the phase of the frequency-modulated signal being used to control the operation of the commutator circuit. As so located and operated, the circuitry of the present invention automatically and dynamically controls the phased operation of the commutator circuit, and thereby the selection of the video drive signals, in a manner offsetting or minimizing the effect of the undesired cross-modulation.

It is, therefore, a primary objective of the present invention to provide means within a beam-index color dispay system for minimizing the effects of cross-modulating of the index-signal with the video signal.

It is an additional objective of the present invention to provide means within a beam-index color display system for dynamically shifting the phase of an index-signal based control signal employed to control the selection of video drive signals in anticipation of the effect of such video signals on the phase of such index signal.

The foregoing objectives, features, and advantages of the present invention will be more readily understood upon consideration of the following detailed description of the invention taken in conjunction with the accompanying drawings.

BRIEF DESCRIPTION OF THE DRAWINGS

FIG. 1 is a general schematic representation of a beam-index color display system incorporating the compensation circuitry of the present invention.

FIG. 2 is a detailed sectional view of the faceplate and display medium of the beam-index cathode-ray tube of the system of FIG. 1 together with certain signals occuring during the operation of such system.

FIG. 3 is a detailed schematic representation of the compensation circuitry of the present invention.

DESCRIPTION OF THE PREFERRED EMBODIMENT

Referring to FIG. 1, there is shown in simplified form a beam-index color display system including a source 20 of video color drive signals, a z-axis commutator 22, a z-axis amplifier 24, a beam-index color cathode-ray tube 26 with its associated beam-generating means 27 and beam-deflection means 28, a photo-multiplier tube 30, an index signal tracking filter 34, and the color-pulling compensation circuit 36 of the present invention. Except for the color-pulling compensation circuit 36, the system of FIG. 1 is conventional and well known to those persons familiar with the art. Omitted from the figure for clarity are those other known circuits, such as power supplies, deflection amplifiers, timing circuits, and the like, necessary to form an operable system. Such circuits are conventional and well known to the art and may be assumed herein for the purpose of complete disclosure.

In the discussion that follows, a basic understanding of beam-index tubes and the color-pulling phenomenon is assumed. For a detailed description of such tubes and phenomenon, see the Morrell et al. reference cited in an earlier section of this specification.

As is the convention, the beam-index cathode-ray tube 26 includes beam-generating means 27 and beam-deflection means 28 for producing and directing, respectively, a narrow focused electron beam 54 toward a display medium comprising a supportive faceplate 40, shown in cross section in FIG. 2, over the interior surface of which is disposed a first spaced array of vertically oriented color phosphor bands 42, 44, 46 and a second spaced array of similarly oriented index phosphor bands 50, with the index bands being arranged so as to have a predetermined periodic relationship with the color bands. The materials of the color bands 42, 44, 46 are chosen to produce, upon excitation by the electron beam 54, luminescence in the colors red, green, and blue, respectively, and the material of the index bands is chosen to produce, upon similar excitation, luminescence in the ultra-violet range. (For ease of visualization, the color phosphor bands 42, 44, 46 are labeled R, G, and B for the color red, green, and blue, respectively, and the index bands 50 are labeled I for index.) Each color band is separated from its nearest color band neighbors by a guard band of black nonluminescent material, such material also shielding the index bands from a viewer on the opposite side faceplate 40.

Before addressing the color-pulling compensation circuit 36 of the present invention, it is helpful to review briefly the operation of a conventional beam-index color display system, that is, the system of FIG. 1 with the compensation circuit 36 removed and the output of the tracking filter 34 applied directly to the control input of the commutator 22. During the operation of such a conventional system, the electron beam 54, the current density of which is maintained at a minimum background level, such as indicated at 54' in FIG. 2, sufficient to least to excite the index bands 50 irrespective of whether the beam density is also being modulated to produce a desired image, is caused to sweep repeatedly across the color bands 42, 44, 46 in a horizontal direction, indicated by the arrow 55', so as to define a raster scan presentation. Each sweep of the beam 54 across an index band 50 causes a pulse of ultraviolet illumination (56 in FIG. 1) to be produced, as indicated at 60 and 62 in curve III of FIG. 2, and reflected back from the faceplate 40 toward the photomultiplier tube 30 where it causes an index signal to be produced for application, after amplification by the amplifier 32, to the tracking filter 34. The tracking filter 34 is preferably of phase-locked-loop design so as to produce a relatively clean frequency-modulated (FM) control signal with a phase corresponding to that of the relatively noisy index signal. (For ease of detection, the point on the density curve 54' at which the slope changes from positive to negative is employed to trigger the filter 34 and define the phase of the index signal.) The FM signal of the tracking filter 34, still assuming a conventional system, is applied to the control input of the commutator 22, a conventional circuit depicted in the diagram of FIG. 1 as a rotating mechanical switch, so as to advance the commutator through one complete cycle of operation for each pulse of ultraviolet illumination detected by the photomultiplier tube 30. Each stepwise advancement of the commutator 22 through a complete cycle causes the three color drive signals produced by the source 20 to be sequentially selected and transmitted, via the amplifier 24, to the beam-generating means 27 of the tube 26 in a manner modulating the current density of the beam 54 with a red drive signal as the beam impinges a red phosphor band 42 and with a green or blue signal as the beam impinges a respective green or blue phosphor band 44 and 46.

If, for example, a signal of constant magnitude is present at only the blue output terminal of the video source 20 at the time of its selection, the beam current will be as indicated at 64 in curve I of FIG. 2 and the resultant luminescence produced by the respective blue phosphor band 46 will be as indicated at 66 in curve II. The current density profile of the beam 54, shown as 54" immediately above the first blue phosphor band 46 of FIG. 2, and its relationship to the size and spacing of the color bands 42, 44, 46 are such that the beam current exciting the blue phosphor affects significantly neither the adjacent green or red bands or the closest index bands.

It is only when the beam current is modulated to excite either a red or green color band that the effects of color-pulling become significant. In the first case, again assuming a drive signal of constant magnitude, the output of the commutator 22 is as indicated at 68 in curve I of FIG. 2 and the resultant red phosphor luminescence is as indicated at 70 in curve II. Now, however, because of the relatively broad-based current density profile 54" of the electron beam 54, the adjacent index phosphor 50' is effected, the particular effect being its premature excitation by the leading edge 54a of the beam current density profile. (Remember, the beam is moving in the direction of the arrow 55".) This premature excitation of the index phosphor 50' causes the resultant ultraviolet luminescence, shown at 72 in curve III, to peak significantly ahead of its normal point at 74. Similarly, a green color drive signal of constant magnitude, producing a beam current pulse 69 and a color luminescence 71 as indicated in curves I and II, respectively, causes the resultant ultraviolet luminescence, shown at 76 in curve III, to peak significantly behind its expected point. Color drive signals of other than constant magnitudes will cause the ultraviolet luminescence peak to be shifted by varying degrees depending on the difference between the two magnitudes. Only if the red and green color drive signals are present in substantially equal magnitudes will the location of the ultraviolet luminescence peak be unaffected as indicated at 78 in curve III. If left uncompensated, the changing phase of the ultraviolet pulses caused by the cross-modulation of the index phosphor, and thereby the index signal, by the color drive signals will cause mismodualtion of the beam current and a resultant degradation of the color quality of the image being produced, that is, the color drive signals will be selected too early or too late to cause the accurate excitation of the various color phosphor bands with the result that image information will be either lost or mispresented.

Turning now to FIG. 3, there is disclosed in schematic form the color-pulling compensation circuit 36 of the present invention. As disclosed, the circuit 36 is divided into a subtractor section 80, an integrator section 90, and a phase-shifter section 100, all interconnected as indicated. The circuit resides operationally in the system of FIG. 1 between the tracking filter 34 and the z-axis commutator 22, and is controlled by the red and green drive signals produced by the video source 20. Each of the three sections forming the compensation circuit 36 are conventional taken alone and it is their combination with each other and the color display system of FIG. 1 that is the basis of the present invention. The subtractor 80 comprises an operational amplifier 85 configured so as to produce at its output terminal 86 a signal that is representative of the instantaneous difference between the red and green drive signals applied to its input terminals 82 and 84, respectively. Variable resistors 87, 88 are provided at the input terminals to permit the two drive signals to be brought into initial balance. The integrator 90 comprises a resistor 91 and capacitor 92 connected in series between the subtractor output terminal 86 and ground, the RC time constant of the two components 91, 92 being chosen to equal the loop filter time constant of the phase-locked-loop tracking filter 34. Lastly, the phase shifter 100 comprises a series-connected resistor 102 and varactor diode 104 coupled via an inductor 94 across the integrator capacitor 92. Provision is also made for coupling the FM signal from the tracking filter 32, via coupling capacitors 114 and 116 and the resistor 102 of the phase shifter 100, to the control input of the z-axis commutator 22.

During operation of the system of FIG. 1 including now the compensation circuit 36 of FIG. 3, the red and green color drive signals present at the output terminals of the video source 20 are applied to both the commutator 22 and the input terminals 82, 84 of the subtractor 80. The magnitudes of the two drive signals are constantly compared by the subtractor 80 in a manner producing an output voltage signal at 86 that is representative of their instantaneous difference. The instantaneous difference voltage produced by the subtractor 80 is integrated by the integrator 90 to produce a voltage across the capacitor 92 that is representative of the anticipated instantaneous phase error between the sensed ultraviolet illumination pulses and the FM signal of the phase-locked-loop filter 34 caused by the cross-excitation of the index phosphors when the electron beam 54 is modulated with the red and green color drive signals. This latter voltage is applied via the inductor 94 to the varactor-based phase shifter 100. With the output signal of the filter 34 coupled into and out of the phase shifter 100 through terminals 110, 112 as indicated, an increase in the magnitude of the red drive signal over that of the green drive signal causes an increased voltage to be developed across the capacitor 92, an increased capacitance to be developed within the varactor diode 104, and a resulting phase lag to be impressed upon the FM signal from the filter 34 to offset the lead caused by the predominence of the red drive signal. Conversely, an increase in the magnitude of the green drive signal over that of the red drive signal will cause a decreased voltage to be developed across the capacitor 92, a decrease in the capacitance of the varactor diode 104, and a resultant phase lead to be impressed upon the FM signal of the tracking filter 34 as the signal moves through the circuit 36.

The terms "lag" and "lead" as used herein indicate a timing relationship between the phase of the FM control signal produced by the filter 34 and the position of the electron beam 54 with respect to an upcoming index band 50. In practice, of course, the compensation circuit 36 cannot introduce "true lead" in the control signal as it passes through the circuit. Consequently, the signal is always delayed a known amount, for example, n (integer) periods defined as "in phase," and a lag of more than n periods is defined as "lag" while a lag of less than n periods is defined as "lead." Thus, the FM signal present at the output terminal 112 of the compensation circuit 36 is at all times a substantially true representation of the actual position of the beam 54 within the tube 26, the effects of cross-modulation of the index signal having been fully removed.

The DC level of the output signal produced by the operational amplifier 85 of the subtractor section 80 may be varied by suitable offset circuitry to provide a proper operating point for the varactor diode 104, and the resistance represented by the resistors 87, 88 may be varied by any suitable means according to the position of the electron beam 54 to provide more or less phase correction for those positions producing varying sizes or shapes.

Accordingly, an invention is disclosed for automatically and dynamically varying the phase of an index signal in a beam-index color display system to compensate for the effects of cross-modulating the index signal with the video signal employed to produce the desired image.

Although the compensation circuit of the present invention has been described in terms of a three-color, three-drive-signal display system it is understood that the circuit, with suitable modification, may be employed in systems with more or less than three colors and drive signals without departing from the invention as disclosed.

The terms and expressions which have been used in the foregoing specification are used therein as terms of description and not of limitation, and there is no intention, in the use of such expressions, of excluding equivalents of the features shown and described or portions thereof, it being recognized that the scope of the invention is defined and limited only by the claims which follow.

I claim as my invention:
1. A beam-index display system comprising:

(a) means for receiving first and second video drive signals representative respectively of first and second differentiable characteristics of an image to be produced;

(b) a beam-index cathode-ray tube including a display medium, means for produing an electron beam, and means for directing said beam toward said medium;

(c) means for causing said electron beam to sweep across said display medium;

(d) means associated with said beam-index cathode-ray tube for producing a control signal representative of the position of said electron beam relative to said display medium;

(e) means for comparing the magnitude of said first drive signal with that of said second drive signal;

(f) means responsive to said comparison of said drive signals for shifting the phase of said control signal an amount proportional to the results of said comparison;

(g) means responsive to said shifted control signal for sequentially selecting said drive signals for application to said beam-producing means of said beam-index cathode-ray tube; and (h) means for modulating the current density of said electron beam in accordance with the magnitudes of said selected drive signals.

2. The beam-index display system of claim 1 wherein said phase-shifting means (f) includes means for causing an apparent lag in the phase of said control signal whenever the magnitude of said first drive signal is greater than that of said second drive signal and a apparent lead in the phase of said control signal whenever the magnitude of said first drive signal is less than that of said second drive signal.

3. The beam-index display system of claim 1 wherein said comparing means (e) includes means for producing a signal representative of the difference in magnitude between said first drive signal and said second drive signal, and wherein said phase-shifting means (f) includes means for delaying said control signal an amount proportional to the magnitude of said difference signal.

4. The beam-index display system of claim 3 wherein a difference signal of predetermined magnitude produces a delay in said control signal of n periods, where n is an integer.

5. The beam-index display system of claim 4 wherein a difference signal of magnitude less than said predetermined magnitude produces a delay in said index signal of less than n periods and a difference signal of magnitude greater than said predetermined magnitude produces a delay of more than n periods.

6. A method of compensating for color-pulling in a beam-index display system comprising the steps of:

(a) providing a beam-index cathode-ray tube having a display medium including a first plurality of display bands, a second plurality of display bands, and a third plurality of index bands, means for producing an electron beam, and means for directing said beam toward said display medium;

(b) causing said electron beam to sweep across said display medium;

(c) producing a control signal representative of the position of said beam with respect to said index bands;

(d) receiving first and second drive signals representative respectively of first and second portions of an image to be produced at said first and second display bands;

(e) comparing the magnitude of said first drive signal with that of said second drive signal;

(f) responsive to said comparison, shifting the phase of said control signal in a first direction when the magnitude of said first drive signal is greater than that of said second drive signal and in a second opposite direction when the magnitude of said first drive signal is less than that of said second drive signal, the amount of said phase shift being proportional to the respective difference between the magnitudes of said drive signals;

(g) responsive to said shifted control signal, sequentially selecting said drive signals for transmission to said beam-producing means of said tube; and (h) modulating the current density of said electron beam in accordance with the magnitudes of said selected drive signals.

* * * * *